United States Patent [19]

Gläser et al.

[11] Patent Number: 4,501,446
[45] Date of Patent: Feb. 26, 1985

[54] REMOVAL OF FINE-GRAINED SEDIMENTS FROM WATER BODIES

[75] Inventors: Eberhard Gläser, Aichwald-Krummhard; Eberhard Beitinger, Stuttgart, both of Fed. Rep. of Germany

[73] Assignee: Ed. Züblin Aktiengesellschaft, Stuttgart, Fed. Rep. of Germany

[21] Appl. No.: 422,624

[22] Filed: Sep. 24, 1982

[30] Foreign Application Priority Data

Dec. 23, 1981 [DE] Fed. Rep. of Germany ....... 3150993

[51] Int. Cl.³ .............................................. E02F 7/00
[52] U.S. Cl. ......................................... 299/9; 34/12; 34/61; 209/10; 432/106; 37/195; 210/747; 210/770; 210/901
[58] Field of Search ...................... 34/12, 61; 210/747, 210/170, 770, 723, 901; 37/195; 432/106; 209/2, 10; 299/9

[56] References Cited

U.S. PATENT DOCUMENTS

| | | | |
|---|---|---|---|
| 936,555 | 10/1909 | McKenna | 299/9 X |
| 1,719,442 | 7/1929 | Newsom | 299/9 |
| 1,930,247 | 10/1933 | McCormick | 209/2 |
| 2,861,353 | 11/1958 | Lellep | 34/61 |
| 4,245,396 | 1/1981 | Maffet | 34/12 |
| 4,330,411 | 5/1982 | Florin | 34/12 |

Primary Examiner—Stephen J. Novosad
Assistant Examiner—Mark J. DelSignore
Attorney, Agent, or Firm—Horst M. Kasper

[57] ABSTRACT

A method for removing fine-grained sediments from flowing or standing bodies of water. The sediment is dredged from the bottom of the body of water. The dredged sediment is dewatered and classified in a sieve plant. At least a fine-grained admixture material such as fly ash or refined clay is admixed to the dewatered sediment material. The admixture is granulated and the resulting granulate is dried and fired under swelling. The swelled, fired granulate is cooled and further processed. The light weight granulate is admixed to concrete or used in the production of building materials such as sinter blocks and bricks. The noxious materials and heavy metals contained in the sediment are substantially sealed into the granules produced by sintering. The resulting waste waters can be cleared such that they are suitable for feeding back into the bodies of water. The residues of the waste water treatment can also be employed as admixture component in the granulate production.

30 Claims, 2 Drawing Figures

REMOVAL OF FINE-GRAINED SEDIMENTS FROM WATER BODIES

BACKGROUND OF THE INVENTION

1. Field of the Invention

The present invention relates to a method for removal of fine-grained sediments from flowing or stationary water bodies, in particular of such sediments containing noxious materials and organic components, which are dug up or dredged at their deposition place.

2. Brief Description of the Background of the Invention Including Prior Art

Based on the lowering of the speed of flow of the water there are generated deposits of drifts, boulders, and sediments in rivers and lakes. The deposits interfere with shipping and decrease the storage volume of catch basins, storage basins and reservoirs. In addition, the sediments can substantially interfere with the water quality based on anaerobic decomposition and whirling up. In case of flooding or high water the deposits diminish the flow cross-section in addition such that the large amounts of water cannot be removed rapidly and safely.

Therefor, it is unavoidable to continuously remove the sediments at the location of their formation. It is known for this purpose to dredge the sediments from flowing or stationary waters with corresponding provisions and then to carry them off. It has been common practice to redeposit the sediments near the banks or to employ them for the filling of natural or artificial hollow spaces. Fine-grained sediments, in particular sludge or mud like sediments with high parts in organic components have been used mostly in agricultural methods and are distributed over the fields according to their exact situation.

Based on absorption or chemical bonding large enrichments of organic and inorganic materials can be found in particular in fine-grained sediments which result in that fine-grained, mud-containing sediments have to be deposited in special depositories after partial dewatering in order to keep the environmental loading within reasonable limits.

A particular problem is posed by the presence of heavy metals such as for example cadmium, the health hazard of which has been proven by enrichment in the food component chain. Based on the noxious materials occurring in the sediments special depositories with particular safety provisions such as for example sealing of foundations and bases have to be provided, where it becomes more and more difficult to find suitable locations based on the large area of land used, in particular in heavy settled regions. Despite expensive provisions it is not possible to prevent that the noxious materials washed out by seeping waters pass (in favorable situations via a purification plant) in part back into the bodies of water. Based on the difficulty of locating a suitable site the special depositories are in general disposed far removed from the location of the removal of the sediments such that considerable distances of transportation have to be overcome. Besides the high expenditures for such transports, the transports in themselves are cause of considerable environmental loading.

The removal of sediments from bodies of water is becoming more and more a problem based on the amounts of sediment generated. For example the river Neckar fed from areas of the Black Forest requires the removal of about two million cubic meters to be dredged and removed and this amount increases each year by 100,000 cubic meters. However, space for depositing the sediments in depositories is only to a limited volume available.

SUMMARY OF THE INVENTION

1. Purposes of the Invention

It is an object of the present invention to provide a method for removing sediments from water bodies associated with low loading of the environment, with low land use requirements and with short transportation distances.

It is another object of the present invention to provide a system for sediment removal from water bodies, where the noxious materials contained in the sediments are bound.

It is a further object of the present invention to employ the dredged sediments in production of light weight building materials.

These and other objects and advantages of the present invention will become evident from the description which follows.

2. Brief Description of the Invention

The present invention provides a method for removing fine-grained sediments from flowing or stationary standing bodies of water which comprises dredging the sediment from the bottom of the body of water, classifying and dewatering the dredged sediment, admixing to the dewatered sediment at least a fine-grained admixture material, drying the granulate, firing the granulate under swelling, and cooling the swelled, fired granulate.

The sediments can contain noxious and/or organic materials or components. The cooled granulate can be further processed, in particular into building materials. Preferably, the granulate is employed as a light weight admixture in the production of building materials. Fly ash can be employed as a fine-grained mineral admixture. The dewatered sediment can be admixed with at least one admixture material at a ratio of from about 70 to 30 percent as referred to the dry weight of the components. The fine-grained admixture material can be clay or refined clay. Also mixtures of refined clay and fly ash can be an admixture material for the sediment.

An additive of up to about 5 weight percent can be added to the mixture. The additive can comprise red mud, oil, waste oil or mixtures thereof. Preferably the granules are dried uniformly. The drying can be performed such that the noxious materials are not carried out and in particular the organic components in the granulate are not allowed to gasify. Preferably, the granulate is fired and swelled in a rotary kiln. The mixture can be mixed in a positive mixer. Oversize particles can be separated from the sediment and be refined for further use. The oversize particles can also be employed in the production of building materials.

The sediment can be dewatered by machine and the resulting filtration waste water generated can be fed back to the body of water after purification. The washing waters of the oversize grain refining can be purified and be fed back to the body of water. The exhaust air of the rotary kiln can be employed for drying purposes. The exhaust air of the firing process can be cleaned and the resulting deposited particles can be added as an admixture to the mixture. The sludge generated during the waste water cleaning can be fed to a mechanical dewatering stage. The sediment can be classified by mechanical sieving. The sediment can be sieved and dewatered in a mobile plant and the admixing, granulating, drying, firing and cooling can be performed in a stationary plant. Alternatively, the above method steps can be performed in a mobile plant. Preferably, the sediment is dewatered in a band filter press machine.

The invention process allows for the first time to provide a substantially complete use of the sediments dredged from water bodies such that they are nearly completely recycled for the material circle. The invention method provides that a high value product is created from the sediments by employing additives, especially by-products, which high value material would otherwise have to be produced by using special raw materials. The removal of sediments, which hitherto had been associated only with costs, has been replaced by the invention through a value creating reincorporation and reintegration in the economic circulation of goods, whereby another otherwise used up raw material can be saved. Since the process steps can all be performed at one location, preferably a location close to the location of dredging, long environmentally loading and cost intensive transport distances are eliminated.

All by-products obtained in accordance with the invention can be further used. The oversized grain can be separated and after washing and classifying it can be employed especially in the production of building materials. The filtration waste water generated during a mechanical dewatering is purified in a waste water treatment plant and fed back to the body of water. Similarly, the waste water generated in the washing of the oversized grains can be purified in a waste water treatment plant. The mud generated during the purification can be fed to the dewatering step together with the sediment.

The waste exhaust air of the firing step can be purified, where the retained deposited materials can form an admixture component and can be added together with the fly ash to the mixture. The exhaust air from the firing process can be cooled to about 300 to 400 degrees centigrade via heat exchangers and is then employed for energy generation and/or drying purposes. Therefor, the invention process allows to produce a light admixture material for producing building materials under use of additional substantial by-products, where all by-products generated during the process are further usable.

The light weight admixture material exhibits a low powder density, a high compression strength and good heat insulation properties. Therefor, it is excellently suited for the production of bricks and building blocks with high heat insulation characteristics. It is further suitable as an additive to construction light weight concrete and other fields of application are also possible.

The novel features which are considered as characteristic for the invention are set forth in particular in the appended claims. The invention itself, however, both as to its construction and its method of operation, together with additional objects and advantages thereof, will be best understood from the following description when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

In accordance with the present invention there is provided a process for the removal and cleaning of flowing or stationary bodies of water from fine-grained sediments, in particular of sediments with noxious matters and organic components, which are dredged or dug up locally with a machine. The process comprises the following steps of classifying and dewatering the dredged sediment deposit, of admixing to the dewatered sediment at least one fine-grained mineral additive, of granulating the mixture, of drying the granulate, of firing and swelling the granulate, and of cooling the swelled and fired granulate for further processing. The admixture material can be employed in an amount of from about 30 to 70 percent relative to dry weight. Preferred admixture materials include fly ash, flue dust, light ashes, clay, and refined clay. Additives can be provided such as for example red mud and oil.

Figure 1:
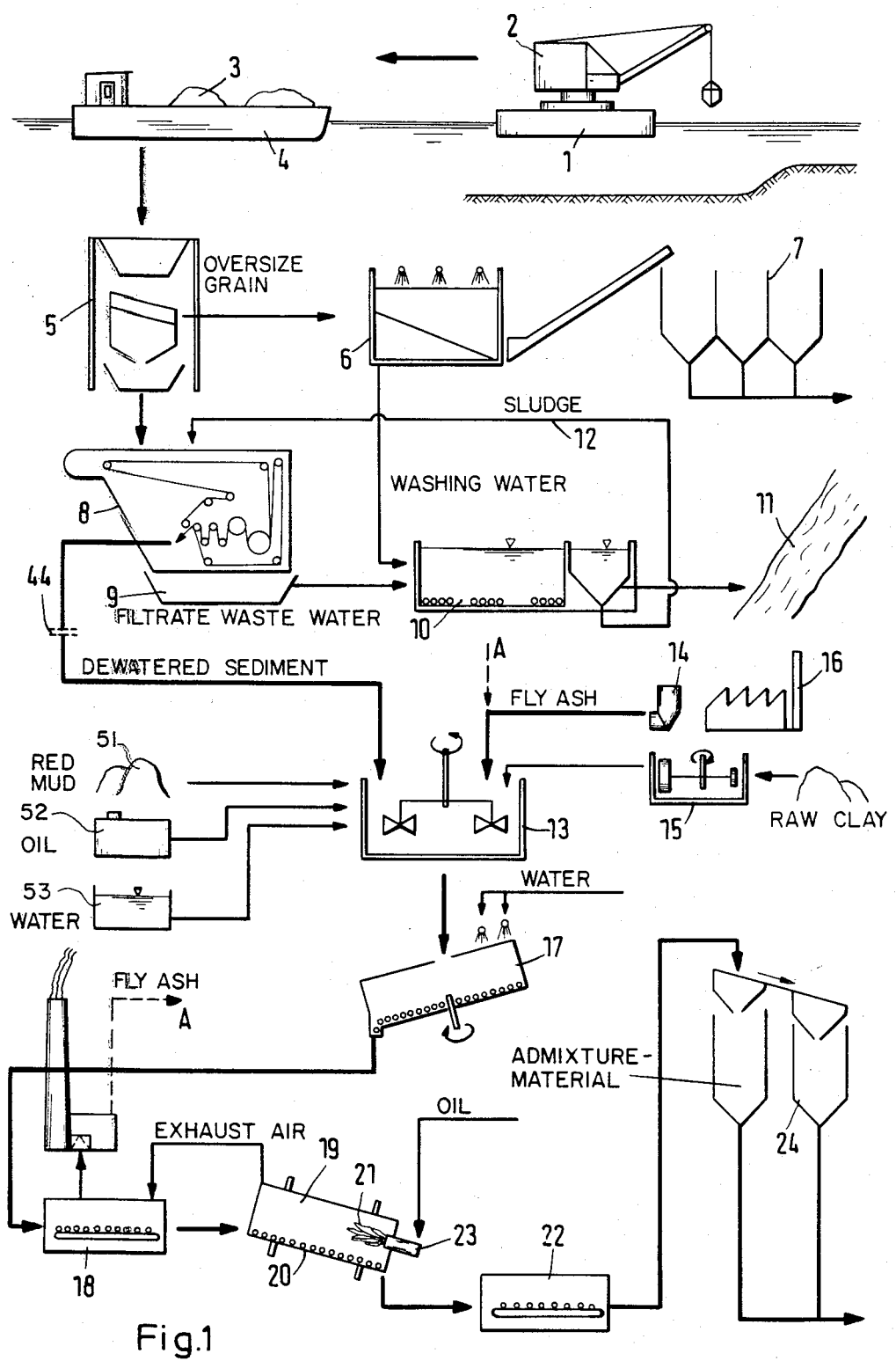
FIG. 1 is a view of a schematic process diagram of the method of the present invention.

Referring now to FIG. 1 there is shown the main course of the process employed according to the present invention by way of the heavy black arrows.

A dredger 2 disposed on a ponton 1 dredges and digs up the sediment, which is brought to a processing plant for example via a barge 4. In case the processing plant is in total provided on a barge, then the dredger 2 can also feed directly the processing plant. The sediment 3 is classified according to grain size, and is for example mechanically sieved in a sieving station 5 in order to separate oversize grains. In principle, also other separating procedures such as for example hydraulic separating procedures can be employed to provide classification of the sediment. The oversized grain is purified in a washing plant and is in the following separated according to grain size and stored in silos or containers 7. The refined oversized grain is preferably fed to the production of building materials, such that it is fed back to the flow cycle of materials and such that in the course of sieving substantially no useless by-product is generated. Similarly, it is also possible to comminute the oversized grains instead of classifying them and then to process the comminuted oversized grains further together with the sediment.

After classifying the remaining sediment is preferably dewatered with a machine such as a band filter press 8, where a dry material contents of up to 45 percent is achievable. The filtration waste waters generated are collected in a collector basin 9 and are purified in a water treatment plant 10 at least to such extent that the chemical values of the running off water are within the allowable limits for flowing into water bodies. Therefor, the purified waste water can be fed directly into the water body 11 and thus be fed back into the natural cycle of the water.

In addition to the possibility shown in the embodiment of dewatering by machine with a band filter press, it is also possible to employ centrifuges, drying ovens, and other technical drying processes and for example also an air drying can be employed.

The sludge produced in the water treatmemt plant 10 is fed back via a pipe conduit 12 to the band filter press 8 such that during clearing, purifying and treating of the waste waters there is generated substantially no waste material not employed in one way or another. Advantageously, also the water used up in the washing plant 6 is fed to the waste water treatment plant 10, such that the waste materials picked up by the water during the separation of the oversized grains from the sediment 3 are further employed.

It can be advantageous to pretreat the filtration waste waters, also together with the soiled wash waters from the washing plant 6, only in part and then to feed them to the usual canal system, where in the case of stationary plants permanent connections can be provided, while in the case of mobile plants collectors can be provided. In case it is necessary, heavy metals can be separated from the filtration waste water by way of corresponding purification steps and provisions.

The above described part of the invention process is already characterized in that starting essentially with the dredging of sediments 3 up to the dewatered sediment there is generated substantially no waste material, but only either further usable materials or materials which are fed back into their natural cycle.

Figure 2:
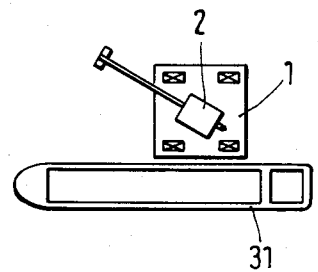
FIG. 2 is a schematic plan view onto a plant for the performance of the invention method.
Figure 2:
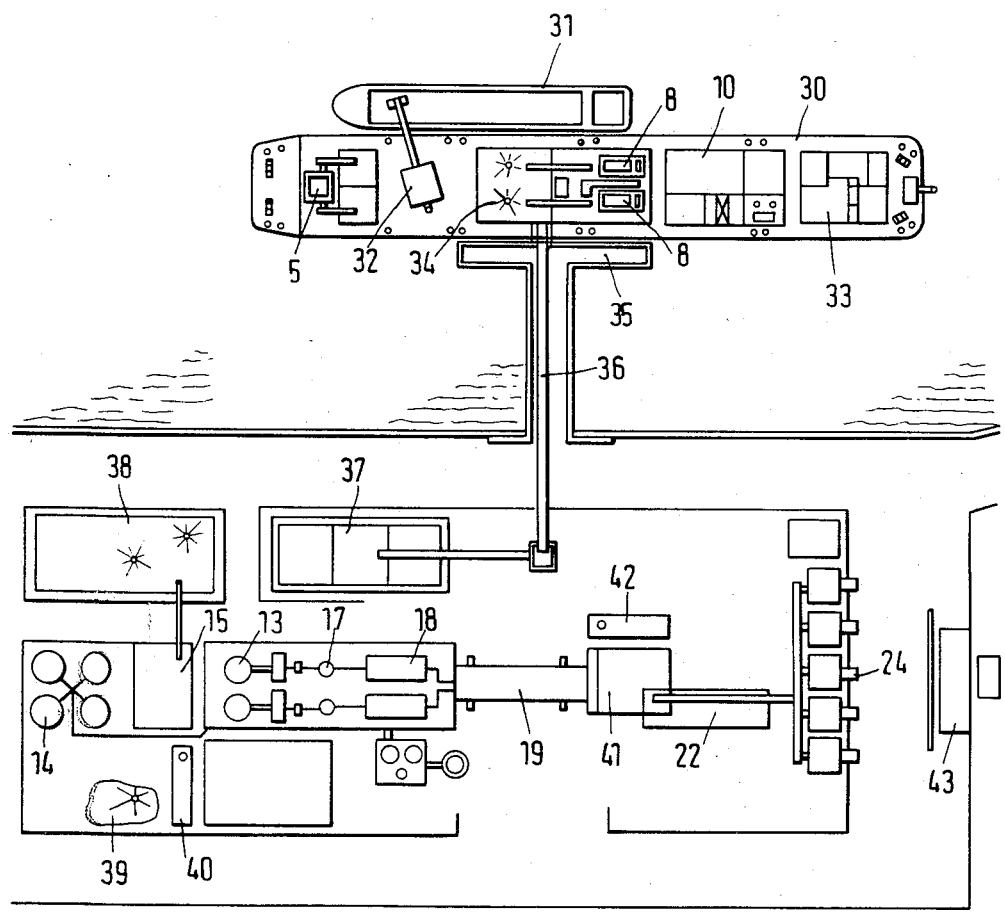

The refining of the sediment 3 to an up to about 45 weight percent dry material can be performed either in a stationary plant or in a mobile plant. A mobile plant can for example be disposed on a barge, which is secured in the area of the dredging operation and which is fed either directly from the dredger or via swimming transport units such as they are shown in FIG. 2.

After the dewatering in the band filter press 8 admixture materials such as for example fly ash and refined clay or the like, which are substantially fine-grained and of a mineral nature, are mixed to the sediment. It has been found to be advantageous to employ a mixing ratio of about 70 percent sediment and 30 percent admixture material as referred to the dry weight. The admixture materials can comprise only fly ash, only clay or also mixtures such as for example fly ash and clay. At least one additive is added to the mixture such as red mud 51, oil 52, used oil, refined used oil 53, other suitable additives or a mixture thereof in an amount of up to about 5 weight percent. Then the sediment 3 is thoroughly mixed in a positive mixer 13 together with the additives and the admixture materials. It can be advantageous to add further additives to improve the swelling properties as well as the surface structure. The contents in liquid of the individual additives as well as of the dewatered sediment assures a sufficient mixing for a following granulate formation, where however if necessary a corresponding amount of water can be added.

The above mentioned red mud is a waste product in the processing of bauxite to alumina according to a method of the Bayer AG of Leverkusen, Germany.

The fly ash substantially comprises dust-free mineral materials, which are produced in modern filtering and depositing units of large coal power plants 16 in increasing amounts. The fly ash can be brought in via closed transport cars or containers and can be placed into a silo 14 for ready use, where it is removed from and fed to the positive mixer 13 preferably by way of pipe conduits.

The raw clay is prepared in a plant 15 to such an extent that it can be added like the fly ash as fine-grained to the sediment in the positive mixer 13.

The additives are stored in a way suitable for this purpose and are similar as the admixture materials added directly to the dewatered sediment filled into the positive mixer. Preferably refined used oil is employed as oil, such that again a waste product is employed which is hard to use otherwise.

After setting of the proper water contents for granulating the mixture is removed from the positive mixer and granulated, preferably pelletized in a known pelletizing plant 17. The granulate or, respectively, the pellets are then dried uniformly in a band drier 18 at temperatures from 300 to 400 degrees centigrade, whereby the granulate is preheated and stabilized in its shape. In this case the drying is performed such that the noxious materials contained in the sediment are not carried out and in particular the organic components of the sediment are not gasified. The waste air from the firing process and of the drying process is purified, where the resulting dust particles are fed to the mixture like the fly ash. For this purpose, the deposited dust particles are fed either to the silo 14 or to the positive mixer 13.

The granulate is fired after the drying process, and this is perferably provided in a rotary kiln 19. The granulate is fed into the downward toward the flame inclined drum of the rotary kiln 19 at the front side disposed opposite to the position of the flame 21. The granulate is conveyed by way of the rotation of the drum toward the flame 21. A temperature shock is performed at the entering into the drum 20 of the rotary kiln 19, where a temperature of from about 100 to 120 degrees centigrade prevails in its flame region, which temperature shock results in a closed sintering shell of the granulate or, respectively, of the pellets such that the materials contained in the sediments such as organic materials, in particular heavy metals (cadmium), pesticides, phenols, aromatic hydrocarbons, phosphates and other materials are solidly enclosed. By way of the rotation of the drum the granulate is continuously brought closer to the flame 20, whereby the pellet or, respectively, the granulate is moved into the region of the maximum temperature. During the passage through the rotary kiln the swelling process occurs by way of which the granulate or, respectively the granulate are provided with their low density and light weight properties. In particular by way of materials delaying the swelling process it is possible to move the swelling process to temperatures which assure that a sealing sintered skin has been formed before the start of the swelling process, such that all materials contained in the sediment are safely enclosed. By way of the firing process in the rotary kiln the granulate or, respectively, the pellets are hardened to a high final hardness. After removal of the granulate from the rotary kiln it is slowly cooled in a cooling provision 22 and is stored for further processing, preferably classifying according to grain size, in silos 24.

Preferably a used oil burner 23 is employed for the firing of the rotary kiln, such that a waste product is also employed for the heating. The waste air of the rotary kiln, which is at about a temperature of 700 degrees centigrade, is cooled to a temperature of about 300 to 400 degrees centigrade and is fed directly to the band drier 18 for the drying of the granulate. The energy of the exhaust air stream from the rotary kiln can further be employed for the operation of the cooling provision 22 by way of corresponding transforming provisions. As an example there is provided an arrangement with a heat exchanger passed through by the exhaust air, where a medium is evaporated and the vapor is employed by way of a suitable device for the generation of electricity.

The swelled granulate is preferably employed as a light weight admixture material similar to bloating clay in the production of sinter blocks and bricks or of construction light weight concrete. The bloated granulate has a low powder density and is provided with a high compression strength. It provides a high heat insulating capacity to the building materials such as sinter blocks and in the light weight concrete there is made possible a high load capacity at a low weight of its own based on the addition of the swelled granulate.

The invention process allows the furhter use of the fine-grained sediments otherwise only deposited in depositories under considerable loading of the environment. The sediments are improved in accordance with the present invention to a further useful commercial material, which is of economic value.

According to the invention process the dredged sediments are provided with only to about a third of the total amount of further waste admixture materials, where as a waste product for example the fly ash of power plants 16 can be employed, which in turn allows the environmentally safe elimination of this waste. The additives such as red mud and refined used oil are also waste products, such that essentially from only waste products a valuable material is created. All by-products occurring in the course of the process are reemployed and are further usable as a material product. The stable bonding of the heavy metals and other noxious materials occurring in the sediments into the swelled granulate is of considerable importance in the invention process such that these undesired components are eliminated from the natural cycle as damaging components.

The invention method in all its steps can be performed substantially at one location which eliminates longer intermediate transportation. For example, a plant for the performing of the total invention process can be disposed directly on a barge, which is locally fed with the sediments from a dredging location. Care has to be taken only that the necessary admixture materials are available to the plant on the barge such as for example fly ash and raw clay as well as the additives. The light admixture material produced from the sediment could be carried away directly by freight barges. It would be advantageous in the context of such a plant if the sediment would not have to be transported over longer distances, such that possibly also closed transporting conduits could be employed. Thereby only few persons would come into contact with the sediment, such that the pathogenic germs contained in the sediment would not be provided with a possibility for expanding.

The advantages to be emphasized of a mobile plant for the performance of the invention method comprise the problem-free reemployment of the resulting products at various locations of application, the limited and temporary loading of the immediate environment of the plant and the low requirement of land areas for the transfer arrangements.

A schematic plan view onto a plant for the performance of the invention process is shown in FIG. 2. A plant required for the performance of classifying and dewatering of the sediment is disposed in the body of a barge 30. The dredger floating on a ponton 1 conveys the sediment directly into readied transportation barges 31, which transport the sediment to the barge body 30. Such a transporting barge 31 is secured in the area of a gripper 32 at the body of the barge 30, where the gripper feeds the sediment into the sieving plant 5. In addition, the band filter press 8, a water treatment plant 10, and corresponding operating rooms 33 are disposed in the body of the barge. Preferably, two band filter presses 8 are disposed next to each other in order to increase the throughput capacity of such a plant. The dewatered sediment is intermediately stored in a container 34, which is located within the operating range of the gripper 32.

The body of the barge 30 is preferably secured at a berth or pier 35 in the bank region of a stationary plant provided for the performing of the steps of admixing, granulating, drying, firing and cooling. The gripper 32 throws the dewatered sediment onto a conveyor belt 36, which feeds the sediment directly to an intermediate storage 37, from which the sediment according to need is brought into the positive mixer 13. A raw clay storage 38, silos 14 for the fly ash, a storage 39 for the red mud and a container 40 for the used oil is provided in the area around the positive mixer. In addition, a clay processing plant 15 is coordinated to the raw clay storage 38. The sediment is mixed with the admixtures and additives in accordance with the invention process, is granulated in the pelletizing machine 17, is predried in the band drier 18 and is fed to the rotary kiln 19. Following to the rotary kiln the cooling of the material is provided in the cooling provision 22 and the following sorting and storing of the swelled granulate in the silos 24. A furnace house 41 as well as a tank 42 for the fuel are coordinated to the rotary kiln. The fuel is preferably used oil. The balance device 43 serves to control the amounts of the swelled granulate furnished.

In order to increase the capacity of the plant it is possible to run the plant in two or more parallel processes.

Of course, it is also possible to arrange the plants stationary or mobile in another way as set forth in the embodiments depending on the operational requirements. For example it can be advantageous to provide the total plant for all steps of the invention with the exception of the further processing of the cooled granulate on one or several barge bodies preferably coupled together. The separation of the plant in a mobile and a stationary part as shown in FIG. 2 corresponds to a separation of the process shown in FIG. 1 at the section line 44.

It will be understood that each of the steps described above, or two or more together, may also find a useful application in other types of water body dredging system configurations and solids-water mixture processing procedures differing from the types described above.

While the invention has been illustrated and described as embodied in the context of a removal method for fine-grained sediments from flowing or standing bodies of water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for removing fine-grained sediments from flowing or standing bodies of water comprising
    dredging the segment from the bottom of the body of water; classifying and dewatering the dredged sediment including the fine-grained material;
    admixing to the dewatered sediment including the fine-grained material at least a fine-grained admixture material;

granulting the mixture;
drying the granulate;
firing the granulate under swelling; and
cooling the swelled, fired granulate.

2. The method for removing fine-grained sediments according to claim 1 wherein the sediments contain noxious materials.

3. The method for removing fine-grained sediments according to claim 1 wherein the sediments contain organic components.

4. The method for removing fine-grained sediments according to claim 1 further comprising processing the cooled granulate.

5. The method for removing fine-grained sediments according to claim 1 further comprising
employing the fired granulate as a light weight admixture in the production of building materials.

6. The method for removing fine-grained sediments according to claim 1 wherein fly ash is employed as a fine grain mineral admixture.

7. The method for removing fine-grained sediments according to claim 1 wherein the dewatered sediment is admixed with at least one admixture material at a ratio of 70 to 30 percent as referred to the dry weight.

8. The method for removing fine-grained sediments according to claim 1 wherein refined clay is added as the fine-grained admixture material.

9. The method for removing fine-grained sediments according to claim 1 further comprising
mixing an admixture material from clay and fly ash.

10. The method for removing fine-grained sediments according to claim 1 further comprising
adding to the mixture an additive at an amount of up to 5 weight percent.

11. The method for removing fine-grained sediments according to claim 10 wherein the additive comprises red mud.

12. The method for removing fine-grained sediments according to claim 10 wherein the additive comprises oil.

13. The method for removing fine-grained sediments according to claim 10 wherein the additive comprises waste oil.

14. The method for removing fine-grained sediments according to claim 10 further comprising
mixing red mud and oil for producing an additive and adding this mixture to the sediment composition.

15. The method for removing fine-grained sediments according to claim 1 wherein the granulate is dried uniformly.

16. The method for removing fine-grained sediments according to claim 1 wherein the drying is performed such that the noxious materials are not carried out and in particular the organic components in the granulate are not allowed to degasify.

17. The method for removing fine-grained sediments according to claim 1 wherein the granulate is fired and swelled in a rotary kiln.

18. The method for removing fine-grained sediments according to claim 1 wherein the mixture is mixed in a positive mixer.

19. The method for removing fine-grained sediments according to claim 1 further comprising
separating oversize particles from the sediment and refining them for further use.

20. The method for removing fine-grained sediments according to claim 19 wherein the oversize particles are employed in the production of building materials.

21. The method for removing fine-grained sediments according to claim 1 wherein the sediment is dewatered by machine; further comprising
feeding the filtrate waste water generated after purification back to the body of water.

22. The method for removing fine-grained sediments according to claim 1 wherein the washing waters of the oversize grain refining are purified and fed back to the body of water.

23. The method for removing fine-grained sediments according to claim 1 further comprising
employing the exhaust air of a rotary kiln for drying purposes.

24. The method for removing fine-grained sediments according to claim 1 further comprising
generating energy from the thermal energy of the exhaust air of the rotary kiln suitable for cooling purposes.

25. The method for removing fine-grained sediments according to claim 1 further comprising
cleaning the exhaust air of the firing process and of the drying process and adding the resulting particle depositions as an admixture to the mixture.

26. The method for removing fine-grained sediments according to claim 1 further comprising
feeding the sludge generated during the waste water cleaning to a mechanical dewatering stage.

27. The method for removing fine-grained sediments according to claim 1 wherein the sediment is classified by mechanical sieving.

28. The method for removing fine-grained sediments according to claim 1 wherein the sediment is sieved and dewatered in a mobile plant and where the admixing, granulating, drying, firing and cooling is performed in a stationary plant.

29. The method for removing fine-grained sediments according to claim 1 wherein the method is performed in a mobile plant.

30. The method for removing fine-grained sediments according to claim 1 wherein the sediment is dewatered in a band filter press machine.

* * * * *